Dec. 30, 1969     L. F. CRAFT     3,486,999
APPARATUS FOR PREVENTING SCALE FORMATION IN WATER SYSTEMS
Filed Nov. 2, 1967
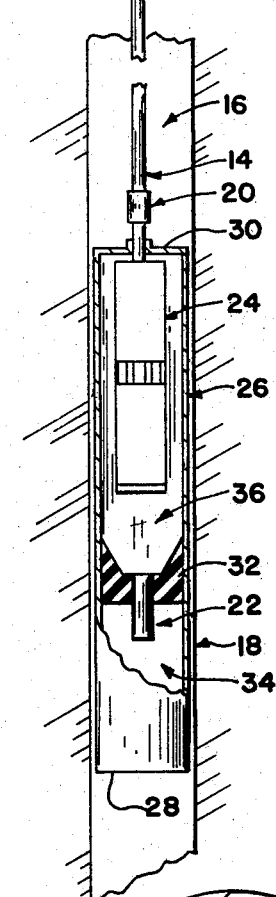
FIG. 1
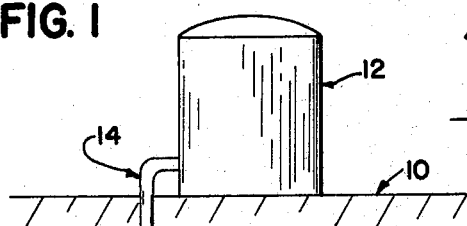
FIG. 6
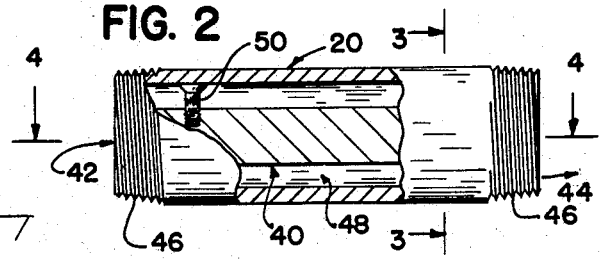
FIG. 2    FIG. 3    FIG. 5
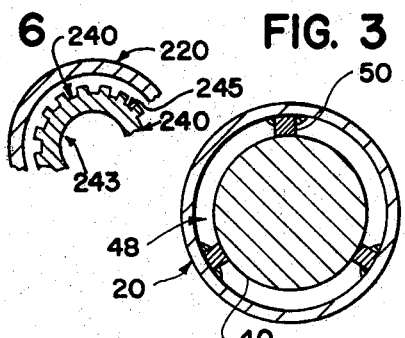
FIG. 4
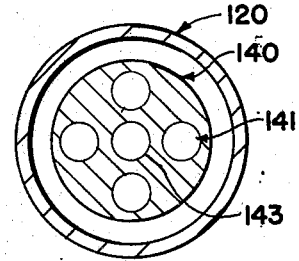
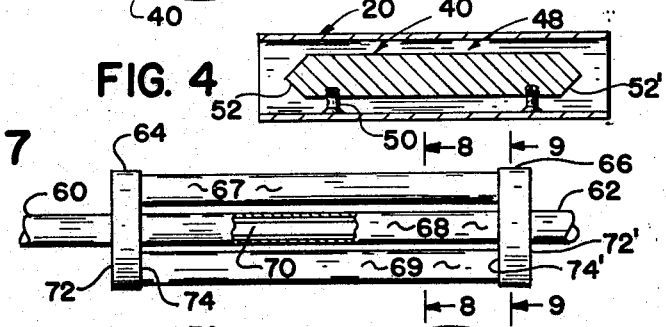
FIG. 7
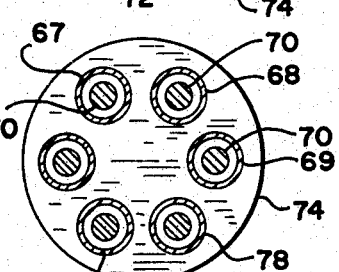
FIG. 8    FIG. 9
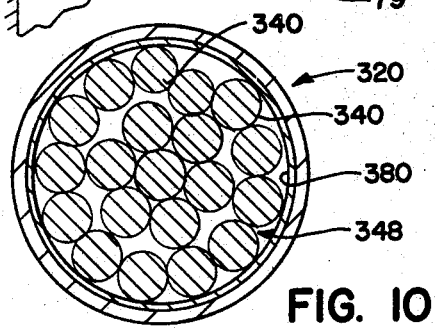
FIG. 10
INVENTOR.
LENARD F. CRAFT
BY
MARCUS L. BATES United States Patent Office 3,486,999
Patented Dec. 30, 1969

3,486,999
APPARATUS FOR PREVENTING SCALE
FORMATION IN WATER SYSTEMS
Leonard F. Craft, P.O. Box 876, Andrews, Tex. 79714
Filed Nov. 2, 1967, Ser. No. 680,250
Int. Cl. C23f 13/00
U.S. Cl. 204—197                    9 Claims

ABSTRACT OF THE DISCLOSURE

An apparatus for eliminating scale formation in fluid conduits, especially water systems, comprised of an anodic core of self sacrificing crystalline metal which decomposes over a long period of time while setting up polarization of the water through the release of energy due to the chemical decomposition reaction between the core and the water. This action prevents scale formation in water lines and is adapted to eliminate or at least minimize the problems of scale formation in both domestic and commercial water systems.

The anodic core is incorporated within a housing which provides a suitable velocity or flow rate therethrough. The reaction between the core and the water provides the necessary polarization to prevent precipitation of salts from the fluid. The particular configuration of the apparatus depends upon the projected use of the device as well as the flow rates involved in the water system.

BACKGROUND OF THE INVENTION

Fluids, especially water from natural and un-natural sources often contain various chemicals in solution therewith which precipitates out to form a scale or deposit on surfaces exposed to the flowing water, particularly when high temperatures are encountered. Often the nature of the scale includes properties causing it to be difficult to remove, and sometime the inside peripheral surface which is contaminated by the scale formation is at a location which proves impossible to remove by chemical or mechanical means. Sometime the formation of scale increases so as to effectively cause stoppage of flow therethrough. A sacrificial metal which is anodic to steel and electrically connected thereto is desirable in reducing scale formation. A dissimilar metal which is placed within a water system in initimate contact with the water in such a manner that the water must pass in fluid flow relationship therewith minimizes the deposition of scales within the water conduits. The metal gradually becomes consumed since it chemically combines or enters into a chemical reaction with the water and accordingly is gradually eaten away.

Different metals of the electromotive series when placed in contact with each other in an electrolitic solution permits the flow of electrolitic current between the metal which serves as the anode and the metal which serves as the cathode. Chemical oxidation of the anodic metal produces the current.

Accordingly, in water systems, especially those which utilize excessively hard water, it is desirable to avoid precipitation of various salts therefrom which lowers the efficiency of the flow system as well as rendering various mechanical devices which use water inefficient due to an accumulation of the salts in the form of a scale or deposit which sometime continue to accumulate until stoppage of flow occurs.

SUMMARY OF THE INVENTION

It is therefore a primary purpose of the present invention to incorporate a self sacrificing anode formed from a crystalline metal into the water system in a manner whereby the water intimately contacts the anode to thereby polarize the water and eliminate the precipitation of salts therefrom.

A more important object of the present invention is to provide a means for the prevention of scale formation in fluid systems.

Another object of the present invention is the provision of apparatus having a consumable crystalline metallic anode which contacts the water and enters into chemical reaction therewith in a manner to reduce scale formation.

A still further object of the present invention is to provide apparatus for mounting an anode within a water conduit to enable optimum activation of the anode so as to obtain improved polarization of the water flowing therethrough.

A still further object of the present invention is to provide an improved and economical means by which deposition of solids from water contained within water system may be prevented.

Another object of the present invention is the arrangement of a consumable metal core within a fluid flowing conduit in a manner which establishes or causes polarization of the fluid flowing therethrough.

The above objects are attained in accordance with the present invention by the provision of a device having an anodic core associated therewith which is fabricated in accordance with the teachings of the present invention.

BRIEF DESCRIPTION OF THE DRAWINGS

FIGURE 1 is a partly diagrammatical partly cross-sectional view of an apparatus made in accordance with the present invention as it may be installed in conjunction with a submersible pump;

FIGURE 2 is an enlarged elevational view of part of the device seen in the foregoing figure, with some parts being broken away and shown in section in order to illustrate the invention thereof;

FIGURE 3 is a cross-sectional view taken along line 3—3 of FIGURE 2;

FIGURE 4 is a longitudinal cross-sectional view taken along line 4—4 of FIGURE 2;

FIGURE 5 is a cross-sectional view of a modification of the device seen in the foregoing figures;

FIGURE 6 is a cross-sectional view of still another modification of the present invention;

FIGURE 7 is an elevational view of a modification of the device seen in the foregoing figures, with some parts being broken away and shown in section to better illustrate the interior thereof;

FIGURE 8 is a cross-sectional view taken along line 8—8 of FIGURE 7;

FIGURE 9 is a cross-sectional view taken along line 9—9 of FIGURE 7; and

FIGURE 10 is a cross-sectional view of still a further modification of the device which is made in accordance with the teachings of the present invention.

BRIEF DESCRIPTION OF THE PREFERRED EMBODIMENTS

As seen in FIGURE 1 a tank 12 located above ground level 10 is connected by flow line 14 to a water producing strata 16 located downhole within a well 18. The invention 20 is operatively interposed in series relationship within the flow line 14 in close proximity of the pumping means or alternatively, upstream of the pump itself as indicated by the arrow at numeral 22. The pump means 24 may be of the submersible type which is encased within a bell housing 26 with the bell housing having an open end at 28 and a closed or bell end at 30, with the bell end being supported in close proximity to the upper terminal end of the pump by the flow line.

A packer 32 which may be in the form of a molded circular plastic cylinder of limited length, or alternatively may be a metal cylinder or centrally apertured plate, so long as it sealingly cooperates between the outer peripheral wall surface of the device 22 and the inside peripheral wall surface of the bell housing 26. The packer should be located sufficiently far above open end 28 to form an inlet chamber 34 and a smaller fluid chamber 36.

Looking now to the details of FIGURE 2 in conjunction with FIGURES 3 and 4 wherein there is seen illustrated housing 20 of the invention, which has previously been seen at 20 and 22 in FIGURE 1. The device includes a crystalline metallic core 40, inlet 42, outlet 44, and threaded depending terminal ends 46. The core is spaced apart from the wall surfaces of the housing 20 so as to form the illustrated annulus 48 therebetween. Support means in the form of radiating studs 50 are screw threaded into the core 40 with the depending terminal end of the stud being welded to the inside peripheral wall surface of the housing in a manner as best seen in FIGURE 3. In the specific embodiment of FIGURES 2 through 4 there are three radially spaced studs placed 120° apart. One set of the studs are located near the inlet and the remaining set of three studs are located near the outlet in the illustrated manner of FIGURES 2 through 4. The size of the stud is three-eighths inch diameter for a two inch core.

Looking now to the details of FIGURE 5 wherein there is seen a housing 120 having an axially aligned core 140 therein with the core having means forming longitudinal passageways 141 and 143 therethrough with passageways being located within the core material itself.

Looking now to the details of FIGURE 6 there is seen illustrated a housing 220 having a core 240 centrally located therein. The core is provided with a multiplicity of longitudinally extending grooves 245 along the outer surface thereof with the grooves being radially spaced apart and circumferentially disposed about the outer periphery of the core. An axially aligned passageway 243 longitudinally extends through the center of the core.

Looking now to the details of FIGURE 7 wherein there is seen still another modification of the device which includes an inlet and outlet 60 and 62 respectively, with the inlet and outlet each being tied or rigidly connected to an inlet header 64 and an outlet header 66 respectively. The headers are flow connected to a multiplicity of housings 67–69 with each housing having a core operatively positioned therein. Inlet header 64 includes plate member 72 which is connected to inlet 60 and plate member 74 which is suitably apertured to receive each of the multiplicity of housings 67–69. The outlet header includes member 72' which is flow connected to outlet 62, and plate member 74' which is suitably apertured to receive each remaining depending end of the multiplicity of housings 67–69.

Looking now to the details of the modification set forth in FIGURE 10, there is seen illustrated by the arrow at numeral 320 a main housing having a multiplicity of cores 340 which jointly cooperate to form a bundle of cores. The cores are supported by the support means 380 which is a steel band tightly fitted about the outer peripheral surface of the bundle. The tightly bundled cores, together with the support means 380 are received in close fitting tolerance within the housing. Fluid flow occurs through the voids left between adjacent rods such as indicated by the arrow at numeral 348.

It has been found that a core having the following chemical composition provides a suitable life while at the same time sufficiently polarizes the water flowing therethrough;

|  | Pounds |
| --- | --- |
| Copper | 81.24 |
| Tin | .50 |
| Lead | .33 |
| Zinc | 13.24 |
| Iron | .19 |
| Nickel | .50 |
| Silicon | 4.00 |
| Total | 100.00 |

A one and one-quarter inch diameter line pipe requires a twenty-eight inch core while a four inch diameter line pipe requires a core of only thirty-six inches in length.

OPERATION

In the operation of the various embodiments, the theory of operation is best explained in conjunction with FIGURE 2. It is thought that water flowing through inlet 42, if of sufficient velocity to be turbulent flow, or above Renolds #2100, produces sufficient frictional loss of energy while flowing over the core whereby the water is subjected to an infinitesimal amount of galvanic action due to the chemical composition of the core with respect to the solids contained within the water and due to the electrolitic action between the core, the water, and the steel wall of the housing. So long as the core is well grounded to the steel housing, this galvanic action, which in some respects may be similar to battery action, is decelerated in chemical activity or rate of reaction due to the conduction or current into the wall by the stud 50 to thereby prevent appreciable deterioration of the core over an extended period of time, sometime amounting to years of service. This slow galvanic action polarizes the water and causes the remainder of the flow system to repell the salts or other solid metals contained in solution within the water rather than permitting them to precipitate out as scale. Accordingly, the housing may be fitted into any existing flow line with the physical size of the housing being chosen whereby the annulus 48 is of substantially the same flow area as the upstream and downstream pipe connected thereto at the inlet and outlet 42, 44 respectively. The size of the core together with the housing must be selected whereby the projected usage thereof maintains a flow across the core which is above laminar flow, i.e., Renolds #2100. At low Renolds numbers, that is at laminar flow, the activity of the core with respect to the flowing water is greatly reduced. When the water system is in standby condition, that is, no flow condition, the chemical reaction is greatly retarded but is still of a sufficient level to provide limited polarization of the water.

While this hypothesis may be proven to be an erroneous explanation of the actual phenomenon which occurs and while the term "polarized water" may be disproved as actually being a galvanic type reaction or the like, nevertheless, this explanation suits the inventor and gives him a thorough understanding and a workable solution to his invention; and, regardless of the accuracy of the above analysis, the invention when practiced according to the teachings of the present application will provide the results claimed herein.

For normal domestic use, the housing may be interposed in series relationship within a flow line, such as illustrated at 20 in conjunction with flow line 14' of FIGURE 1. The device should always be placed at the extreme downstream side of the flow system so as to treat the entire water system.

In practice, a two inch diameter core of the configuration seen in FIGURE 2, when placed in a three inch diameter line pipe is suitable for most homes.

In actual practice, the following core and housing sizes have been found satisfactory:

| Core OD (inches) | Line pipe, nominal (inches) |
|---|---|
| 1 | 1¼ |
| 1⅛ | 1½ |
| 1½ | 2 |
| 2 | 3 |

The present invention is particularly adapted for use in a water well system since it can be installed either upstream or downstream of the entire water supply. When it is desired to install the device in conjunction with a submersible pump, it is advantageous to install a bell housing about the entire submersible pump 24 and provide the bell housing with a packer near the pump so as to leave a large inlet chamber 34. Water and sand which enters the inlet chamber 34 are greatly reduced in velocity due to the large size of the chamber whereupon sand is precluded from flowing through the chamber 22 due to the low velocity of the water as it flows through the inlet chamber 34. The sand falls to the bottom of the well when the pump is de-energized. The clean water is forced to flow through the chamber 22 whereupon all the water flowing into the pump 24 is polarized, thereby leaving the entire system, beginning at the bottom of the well, free from the formation of scale. This greatly enhances the life of the pump along with all of the downhole flow lines as well as the entire system which is connected to the storage tank.

In low velocity flow systems, one of the embodiments of FIGURES 2 through 6 is best employed. In low velocity flow systems the embodiment of FIGURE 5 offers greater surface area to the flowing fluid due to the additional passageways 141 and 143 which are provided in the core. Alternatively, the embodiment of FIGURE 6 may be employed wherein the fins at 240 to 245 along with the axial passageway 243 offers a greater surface area of the core to the flowing fluids.

In commercial usage, where the demand for water is much greater than in the domestic system of FIGURES 1 through 4, multiple housings 67–69 may advantageously be attached to headers 64, 66 with the headers being interposed in series relationship within a large flow line 60, 62 whereupon water entering inlet 60 flows into header 64 where the flow divides into parallel paths and continues through the individual housing, after which the polarized water is collected at the common header 66 where it then flows on through the single outlet to the point of usage.

In order to avoid casting a multiplicity of cores 40, it is advantageous to extrude the core as a single rod 340 whereupon the rods may be tightly bundled within a steel band 380 which also serves as the support means. The steel bands may be rigidly welded to the chamber 320. This enables any number of cores to be made into a bundle of any desired size merely by predetermining the number of cores required for a specific application, whereupon the cores can be bundled, slid into the preselected chamber where the cores are rigidly fastened by welding the band to the inside peripheral wall surface of the chamber.

It has been found advantageous to also use the device in conjunction with dry cleaning fluids, oil, and in applications requiring the absence of static electricity.

I claim:

1. In a bore hole having a down hole pump for lifting fluid from a fluid producing portion of the bore hole to the surface of the ground through a flow line, the improvement comprising:
   a bell housing longitudinally disposed within the bore hole and having a bell end and an open end with the pump being received therewithin, and with said open end adapted to be placed in communication with the fluid produced from the fluid producing portion of the bore hole;
   an elongated housing, an anodic core, a packer, support means mounting said core to the inside peripheral wall surface of said housing, the outside dimension of said core being smaller with respect to the inside dimensions of said housing to thereby form an annular fluid flow path between said core and said housing;
   said packer circumferentially surrounding said housing and located between the open end of said bell housing and the pump to thereby form a fluid chamber and an inlet chamber with the chambers being spaced apart from one another by said packer and with the chambers being in fluid communication with one another by the annular fluid flow path; whereby:
   fluid can flow into said inlet chamber, through the annulus between said core and elongated housing, and into said fluid chamber where the fluid is pumped into the flow line, and wherein said inlet chamber separates debris from the fluid while said core prevents scale formation downstream thereof.

2. The device of claim 1 wherein said core is an elongated round rod having each terminal end in the form of a triangle in longitudinal cross-section appearance;
   said support means including spaced apart studs having a threaded end portion; means forming radially extending threaded apertures within said core, said apertures circumferentially extending about said core, said studs being threadly received by said apertures of said core, and the depending ends of said studs opposite said threads being welded to said housing.

3. The device set forth in claim 1 wherein said core is formed from a mixture selected from the group consisting essentially of copper, tin, lead, zinc, iron, nickel, and silicon.

4. The device set forth in claim 1 and further including;
   means forming longitudinally extending passageways extending through said core;
   said passageways being parallel to each other, located within said core, and radially spaced apart from one another.

5. The device set forth in claim 1 and further including:
   a multiplicity of longitudinally extending grooves formed in the outer peripheral surface of said core and circumferentially extending thereabout, and a longitudinally extending passageway located within and axially extending through the core.

6. The device of claim 1 and further including:
   spaced apart headers, a multiplicity of said housings each having a terminal end thereof flow connected to one said header;
   one said header having means forming an inlet; the remaining said header having means forming an outlet.

7. The device of claim 1 and further including:
   a multiplicity of cores circumferentially surrounding the centrally aligned core; said support means being a steel band rigidly compressing all of the cores into a bundle, and said steel band being rigidly affixed within said housing.

8. The device of claim 1 wherein said core is an elongated round rod having each terminal end in the form of a triangle in longitudinal cross-section appearance:
   said support means including spaced apart studs having a threaded end portion; means forming radially extending threaded apertures within said core, said apertures circumferentially extending about said core, said studs being threadedly received by said apertures of said core, and the depending ends of said studs opposite said threads being welded to said housing;
   said core being formed from a mixture selected from the group consisting essentially of copper, tin, lead, zinc, iron, nickel, and silicon.

9. The device set forth in claim 1 and further including:
- longitudinally extending passageways extending through said core;
- said passageways being located within said core and radially spaced apart from one another;
- said core being an elongated round rod having each terminal end in the form of a triangle in longitudinal cross-section appearance;
- said support means including spaced apart studs having a threaded end portion; means forming radially extending threaded apertures within said core, said apertures circumferentially extending about said core, said studs being threadedly received by said apertures of said core, and the depending ends of said studs opposite said threads being welded to said housing.

References Cited

UNITED STATES PATENTS

| | | | |
|---|---|---|---|
| 1,608,709 | 11/1926 | Mills | 204—197 X |
| 2,358,981 | 9/1944 | Lathner | 137—240 X |
| 2,415,576 | 2/1947 | Brown | 204—197 |
| 2,756,204 | 7/1956 | Higgins | 204—197 |
| 2,805,988 | 9/1957 | Rader | 204—197 X |
| 2,846,385 | 8/1958 | Buchan | 204—197 X |
| 3,005,555 | 10/1961 | Bosworth | 204—197 X |
| 3,047,478 | 7/1962 | Marsh | 204—197 X |
| 3,251,427 | 5/1966 | Ewing | 204—197 X |
| 3,342,712 | 9/1967 | O'Keefe | 204—197 X |

CLARENCE R. GORDON, Primary Examiner

U.S. Cl. X.R.

137—240